(No Model.) 4 Sheets—Sheet 1.

E. REYNOLDS.
VALVE AND VALVE GEAR.

No. 552,926. Patented Jan. 14, 1896.

Witnesses.
Sidney P. Hollingsmith
C. B. Bull

Edwin Reynolds,
Inventor,
by his attorneys,
Dodge Son.

(No Model.) 4 Sheets—Sheet 2.

E. REYNOLDS.
VALVE AND VALVE GEAR.

No. 552,926. Patented Jan. 14, 1896.

Witnesses:
Sidney P. Hollingworth
C. B. Bull

Edwin Reynolds,
Inventor
by his attorneys,
Dodge & Sons.

(No Model.) 4 Sheets—Sheet 3.

E. REYNOLDS.
VALVE AND VALVE GEAR.

No. 552,926. Patented Jan. 14, 1896.

Witnesses,
Sidney P. Hollingsworth
C. B. Bull.

Edwin Reynolds,
Inventor,
by his attorneys,
Dodge & Son.

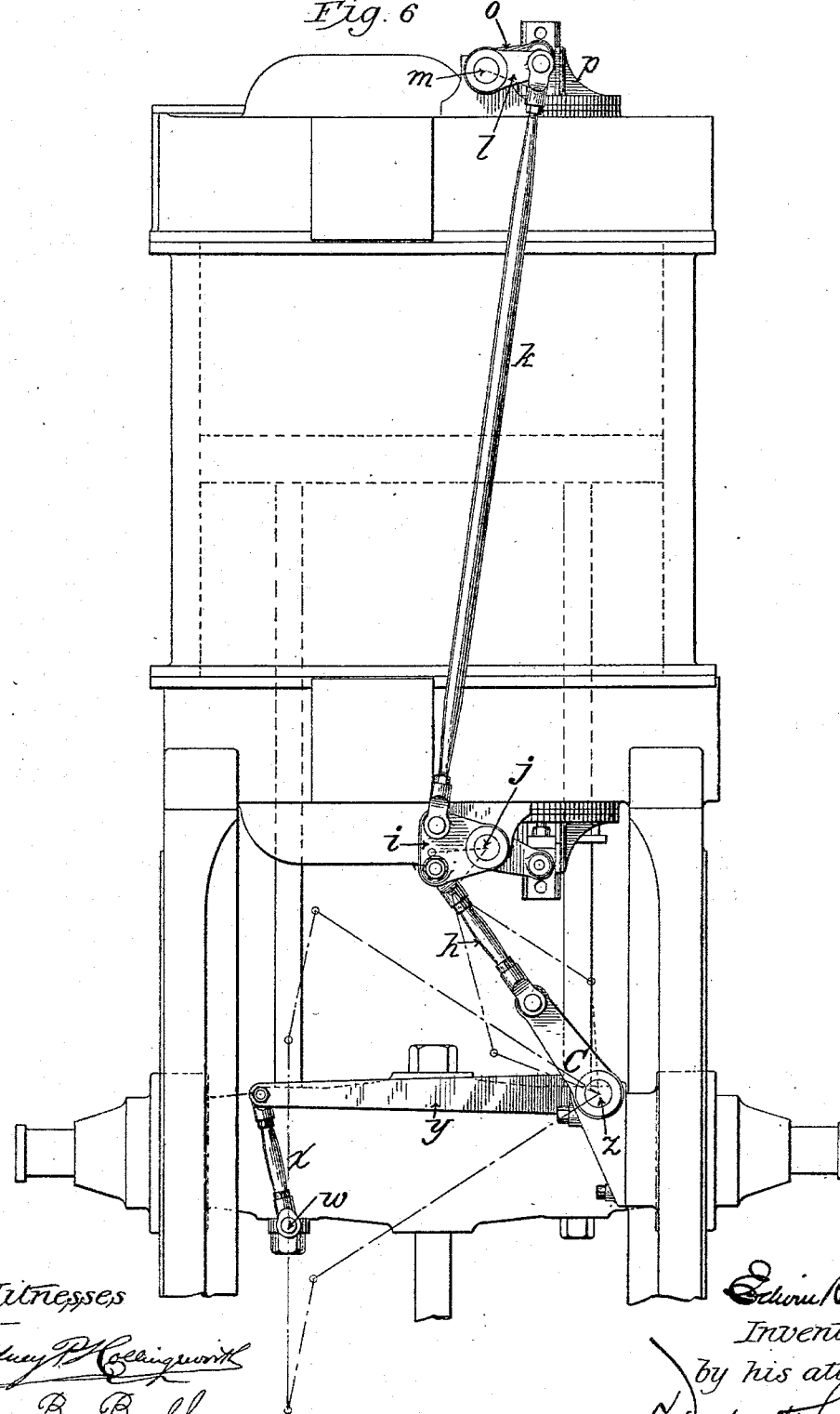

UNITED STATES PATENT OFFICE.

EDWIN REYNOLDS, OF MILWAUKEE, WISCONSIN.

VALVE AND VALVE-GEAR.

SPECIFICATION forming part of Letters Patent No. 552,926, dated January 14, 1896.

Application filed July 6, 1895. Serial No. 555,155. (No model.)

*To all whom it may concern:*

Be it known that I, EDWIN REYNOLDS, a citizen of the United States, residing at Milwaukee, in the county of Milwaukee and State of Wisconsin, have invented certain new and useful Improvements in Valves and Valve-Gear, of which the following is a specification.

My invention relates to blowing-engines, air-compressors, and the like, and has reference more particularly to a novel construction of the delivery-valves and the means for operating the same.

The object of the invention is to provide means by which the delivery-valves are left entirely free to open as soon as the pressure inside the cylinder is equal to or exceeds the pressure in the delivery-pipe; also to return the valves to their seats when the main piston is at or near the end of its stroke, and, finally, to prevent the valves from opening too quick or coming into direct metallic contact at the outward limit of their lift or movement.

Figure 1:
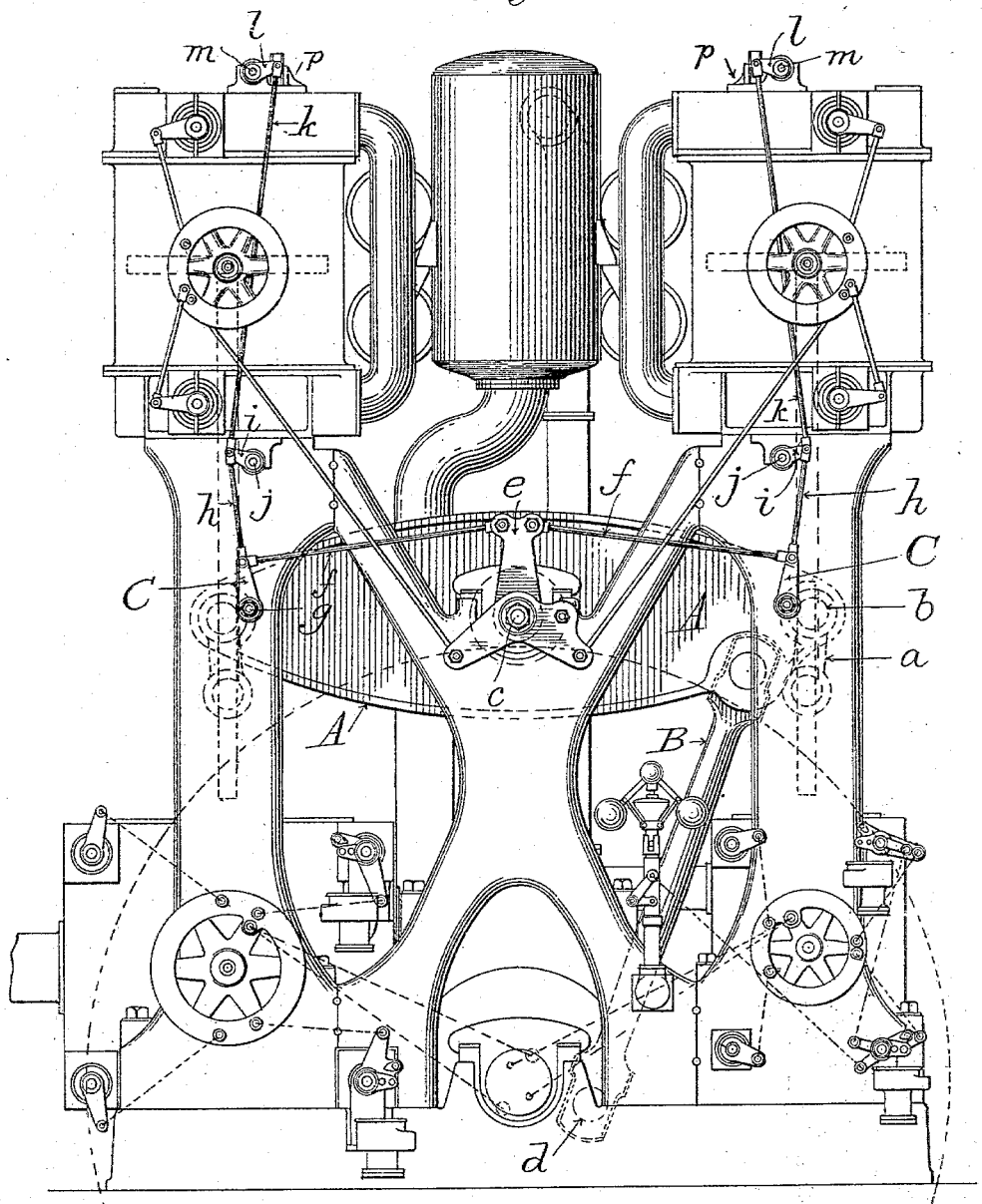
Figure 3:
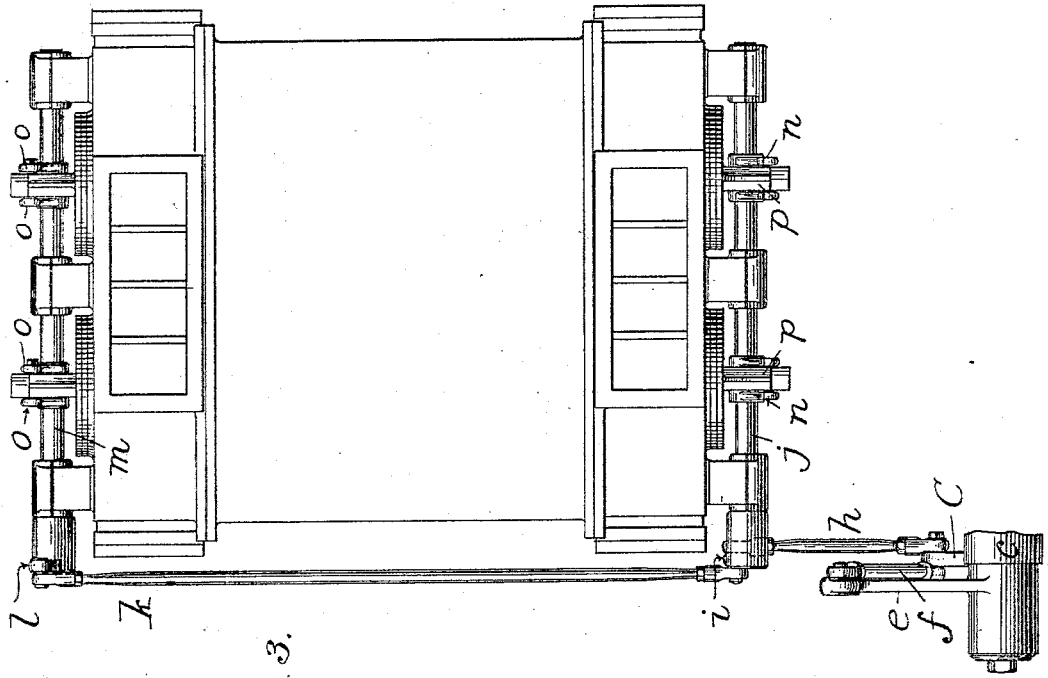
Figure 2:
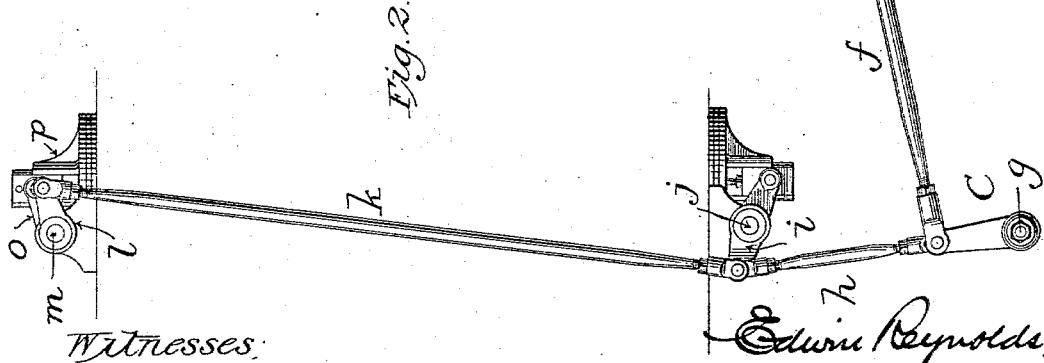
Figure 4:
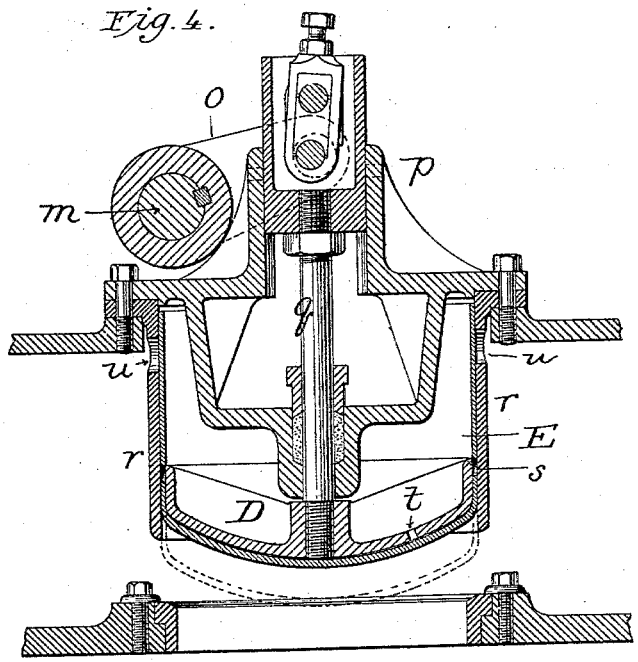
Figure 5:
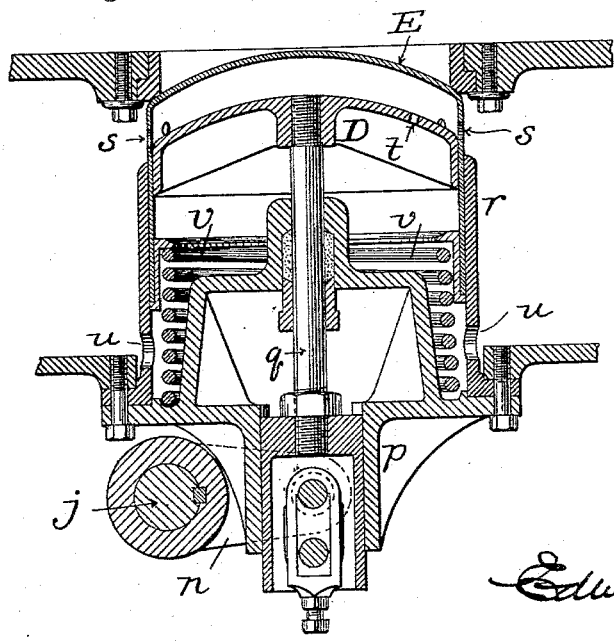

In the drawings, Figure 1 is a face view of a portion of a blowing-engine driven by a compound steam-engine and having my improvements applied thereto. Fig. 2 is a face view, on a larger scale, of the connections for operating the delivery-valves; Fig. 3, a side view of the same; Figs. 4 and 5, sectional views of the upper and lower delivery-valves, respectively; and Fig. 6 a view illustrating the application of my invention to a blowing-engine operated by a single-acting steam-engine.

In a blowing-engine such as I have represented in Fig. 1 the piston of the air-cylinder and the piston of the steam-cylinder at each side are connected by suitable rods to a cross-head, each of which is in turn connected by a suitable link $a$ to a pin $b$, fixed at each end of a beam A, as shown. Beam A is supported at its center by a suitable shaft $c$, and is designed to be rocked on said shaft by means of the pitman B, connected at its lower end to a crank-pin $d$, turning with the shaft that carries the fly-wheel. From this it will be seen that the circular motion of the crank-pin gives a definite vibration to the beam, which in turn gives a positive stroke to all four pistons. Secured rigidly to the shaft $c$ is an arm $e$, which necessarily partakes of the motion of the beam or of the pistons, and which arm is connected by means of a link or rod $f$ with a rocking or oscillating part or member C.

It is to be distinctly understood that the mechanism hereinbefore described for imparting motion to the part or member C will be varied according to the character, style, or type of engine to which my invention is applied, and hence I do not wish to restrict myself to the precise means shown for giving motion to the said part C.

The part or member C is an arm or lever adapted to rock or oscillate upon a pin, stud, or short shaft $g$, secured to the engine-frame, and it is connected by means of a link or rod $h$ to an arm $i$ secured to the end of a rock-shaft $j$, (shown in Figs. 1, 2, 3 and 5,) journaled on the bottom or lower head of the air-cylinder. The said lever C, link $h$, and arm $i$ are so set and arranged with reference to each other that the center of the lever and the center of the link form a straight line when the piston is at the middle of its stroke, in which position the arm $i$ on the rock-shaft $j$ is thrown back into its farthest point and the valve-piston is at its greatest distance away from the valve. Another link connection $k$ is arranged between the arm $i$ and a similar arm $l$ affixed to a second rock-shaft $m$, journaled on the top head of the air-cylinder, thereby giving to the arm $l$ the same motion as is given to the arm $i$. On the two rock-shafts $j$ and $m$ are also fixed the radial arms $n$ and $o$, which latter move in guides $p$ and are connected by rods $q$ to the pistons D moving freely inside the delivery-valves hereinafter fully described. From this it will be seen that these last-mentioned pistons D have a motion imparted to them by the motion of the main piston or pistons, and that the said motion is of such a nature that these pistons D have one up and one down stroke for each stroke of the main piston or pistons. In other words, when the main piston is at one dead-center the valve-pistons D are nearest the valve-seats, but when the main piston is at the middle of its stroke the valve-pistons D are farthest away from the valve-seats, and will gradually return toward the same as the main piston advances toward the other dead-center. These motions occur in precisely the same manner for each stroke of the main piston, and possess the desired features for operating the delivery-valves now to be described. These two valves are similar in construction, and a description of one will suffice for both, such differences as are due to the different positions of the valves being, however, particularly pointed out.

The valve proper E is made preferably of solid drawn steel, cylindrical in form, with a convex or semispherical bottom, as shown in Figs. 4 and 5. This valve is fitted loosely inside a guide $r$, while the piston D above referred to is fitted loosely inside the valve. The valve is provided with a series of holes $s$ a few inches from its seat, to serve as an air-passage, while the piston D also has a series of holes $t$ forming an air-passage, the arrangement of the valve-holes $s$ being such that they may be closed by the valve passing inside its guide, and may also be closed by the piston D.

The operation of the valves in relation to the air-pressures and to the mechanism before described is as follows: Suppose that the working pressure in the air-delivery pipe is one atmosphere above atmospheric pressure. This will open the delivery-valves when the main piston is about at the middle of its stroke. In that position the valve-piston D will be farthest away from the valve E, and the valve being carried from its seat by the pressure inside the cylinder will fly toward the piston D; but the air which is interposed between the valve and its piston, forming a cushion, is allowed to gradually escape in diminishing quantities first through the holes in the valve and piston, and later through the apertures in the piston. By this means the metallic contact between the valve and its piston will not occur before the whole energy of the valve has been absorbed by the air-cushion, and after it has occurred the piston D will gradually carry the valve back to its seat against the current of air yet being delivered by the main piston. When the main piston is at the end of its stroke, the valve-piston D will have brought the valve nearest to its seat. The valve closes gradually—that is, in proportion to the air delivered from the cylinder, the air thus delivered decreasing in quantity as the main piston reaches the end of its stroke. A moment later the pressure inside the cylinder will be less than that in the delivery-pipe, and the air finding its way through the apertures in the valve-piston forces the valve to its seat, while the said piston will be withdrawn by the mechanical movement already described. By virtue of said movement the valve-piston will now make one up and one down stroke within the valve without any effect. For the purpose of having the delivery-pipe pressure in the space between the valve and its cover a series of holes $u$ is drilled in the guide-piece for the valve.

It will be noted from the above that the pressure is relied upon for keeping the valves on their respective seats. While this is true after the pressure has been gained and holds good at all times for the top valves in a vertical machine, it will not do for the bottom valve of a vertical machine nor for the valves in a horizontal machine. In the latter cases it becomes necessary to employ a spring $v$, Fig. 5, of sufficient strength to sustain the weight of the valve until the necessary pressure has been accumulated to make the valves work normally.

When the invention is applied to a single-acting engine, the beam is dispensed with and the cross-head connected with the main piston is connected by means of pin $w$ and link $x$ with one end of an arm or lever $y$, as shown in Fig. 6. The said lever $y$ is secured to a rock-shaft $z$, which is mounted on the main frame and which rock-shaft carries the part or member C. Of course the rising and falling of the cross-head will impart a rocking or oscillating motion to the rock-shaft and its member C.

It is to be understood that any convenient connection may be made between the delivery-valve pistons and any moving part of the blowing or air-compressing machinery, provided only that the described relation be maintained as to the times of their respective movements. The expression "connected with the main piston" is therefore to be understood as meaning connected through any intermediate devices or mechanism which shall preserve the stated relation and action of the parts.

Having thus described my invention, what I claim is—

1. In a blowing engine or like machine, the combination with the cup-shaped valve; of a guide therefor; a piston fitting within said valve; and means for imparting motion to the valve piston from a moving part of the machine, in a certain definite relation to the stroke of the main piston.

2. In a blowing engine, or like machine, the combination with a valve arranged to be raised from its seat when the pressure in the cylinder exceeds that in the delivery pipe; of a piston fitting within the valve and having a positive motion of a certain definite relation to the stroke of the main piston.

3. In combination with the cup-shaped valve closed at one end; the piston fitting within the valve, and having a movement of a definite relation to the movement of the main piston of the machine; and air passages formed in the valve and piston, whereby the air confined between the valve piston and the end of the valve, forms a cushion to control the opening of the valve.

4. In combination with the cup-shaped valve provided with an air passage; the piston working within the valve and also provided with an air passage; a guide for the valve provided with an air passage leading from the delivery pipe; and means for moving the valve piston.

5. In a blowing engine, the combination with the delivery valve thereof; of a piston for said valve; and connections between the valve-piston and a moving part of the engine whereby the valve-piston shall carry the valve to its seat when the main piston is at the end of its stroke.

6. In a blowing engine, the combination with the delivery valve thereof; of a piston for said valve; and mechanical means operatively connecting the valve-piston with a moving part of the engine whereby the valve-piston shall be so moved as to allow the valve to be raised from its seat to open fully, when the main piston is at the middle of its stroke.

7. In a blowing engine, the combination with the delivery valve thereof; of a piston for said valve; and mechanical connections between the valve-piston and a moving part of the engine whereby the valve-piston shall carry the valve to its seat when the main piston is at the end of its stroke, and whereby also the valve-piston shall be so moved as to allow the valve to be raised from its seat to open fully, when the main piston is at the middle of its stroke.

8. In a blowing engine, the combination of the delivery valves and their pistons, and mechanical devices receiving motion directly or indirectly from the main piston, and connected with the valve-pistons whereby the delivery valves are all forced to their respective seats when the main piston is at dead centers, and all of said valves are free to open automatically by the pressure created by the travel of the main piston at any part of its stroke.

9. In a blowing engine, the combination of the delivery valves and their pistons; a spring for supporting the valves until the pressure is gained; and mechanical devices receiving motion directly or indirectly from the main piston, and connected with the valve-pistons whereby the delivery valves are all forced to their respective seats when the main piston is at dead centers, and all of said valves are free to open automatically by the pressure created by the travel of the main piston at any part of its stroke.

10. In a blowing engine, the combination with a delivery valve free to open automatically by the pressure due to the travel of the main piston at any part of its stroke; of a piston for said valve; and connections between the valve-piston and a moving part of the engine for causing said valve-piston to force the valve to its seat when the main piston is at dead centers.

11. In an air compressor, blowing engine, or like machine, the combination with the delivery valve and its piston; of the main pumping piston; a rocking lever C; a rock-shaft $j$ provided with an arm $n$ connected with the valve piston; a second arm, $i$, secured to said shaft $j$; a link or rod $h$ connecting the lever C with the arm $i$; and devices for imparting to the arm C a movement having a definite relation to the movement of the main piston, whereby when the main piston is at the middle of its stroke, the rod $h$ shall be in line with the lever C and the valve piston shall be at its greatest distance from the valve seat.

In witness whereof I hereunto set my hand in the presence of two witnesses.

EDWIN REYNOLDS.

Witnesses:
   A. J. WEST,
   W. E. DODD.